United States Patent [19]

Crawford et al.

[11] Patent Number: 4,798,221

[45] Date of Patent: Jan. 17, 1989

[54] SELF SEALING ANTI-KNOCK DIVERTER VALVE

[75] Inventors: Dennis W. Crawford, Pontiac; Larry G. Turner, Clarkston, both of Mich.

[73] Assignee: Masco Corporation of Indiana, Taylor, Mich.

[21] Appl. No.: 78,382

[22] Filed: Jul. 27, 1987

[51] Int. Cl.[4] .............................................. F16K 11/02
[52] U.S. Cl. ..................................................... 137/119
[58] Field of Search ........................................ 137/119

[56] References Cited

U.S. PATENT DOCUMENTS

| | | | |
|---|---|---|---|
| 2,769,454 | 11/1956 | Bletcher | 137/119 |
| 2,949,933 | 8/1960 | Moen | 137/119 X |
| 3,472,279 | 10/1969 | Sanderson | 137/119 X |
| 3,499,440 | 3/1970 | Gibbs | 137/119 X |
| 4,577,653 | 3/1986 | Marty | 137/119 |

FOREIGN PATENT DOCUMENTS 583035 10/1958 Italy ...................................... 137/119

*Primary Examiner*—Robert G. Nilson
*Attorney, Agent, or Firm*—Steven L. Permut; Malcolm L. Sutherland

[57] ABSTRACT

A diverter valve assembly (10) has a one piece valve seat member (26) that is fitted within a cavity (12) of the faucet body (14). The one piece valve seat member has a flexible peripheral lip (62) with an annular recess (64) that allows fluid to pressurize and exert an outward force on the lip to move the lip and seal it against the valve cavity. Furthermore, the one piece valve seat member has prongs (44) which resiliently bias the spool assembly (28) to a first position to reduce chattering of the valve assembly and to provide an anti-siphon system. A cup valve (36) has a thin peripheral lip (76) at an end of a peripheral section (75) that is about a tubular inner section (78) that has a narrow annular groove (79) therebetween which limits collapse of the cup valve (36) during operation thereof as a pressure responsive piston to move the valve element (34) to a closed position.

12 Claims, 3 Drawing Sheets

SELF SEALING ANTI-KNOCK DIVERTER VALVE

TECHNICAL FIELD

This invention relates to valve assemblies and more particularly to a diverter valve that incorporates a self sealing valve seat, an anti-knock mechanism, and an improved cup valve.

DISCLOSURE INFORMATION

Diverter valves are commonly used in faucet assemblies to divert water to either the spout or a hand spray. In kitchen faucets, it is common for water to pass through a spout or a hand held spray. The diverter valve assembly shuts off the flow through the faucet spout when the spray is operated. When the spray is shut off, the diverter valve automatically repositions to allow flow of water to the spout. Diverter valves, however, have often failed to completely shut off flow from the spout when the spray is turned on. An annoying drip or small stream remains particularly if high pressure exists in the supply lines.

Diverter valve assemblies have been made in cartridge form. U.S. Pat. No. 4,577,653 issued Mar. 25, 1986 to Garry Marty discloses a cartridge valve mechanism with biasing prongs to bias the valve element to one position. A separate seal is placed against a valve chamber shoulder to seal the first outlet from the second outlet about the valve cartridge. A cup valve has a shoulder to prevent excessive collapsing of the cup valve.

The diverter valve mechanism such as the one shown in U.S. Pat. No. 3,056,418 issued Oct. 2, 1962 to Adams et al has an o-ring mounted about the valve seat member to seal one outlet from the second outlet.

What is needed is a cup valve within the diverter valve that maintains sufficient cross-sectional area so that when the spray is on, the diverter valve completely cuts off flow to the spout outlet.

Furthermore, what is needed is a diverter valve having a one piece valve seat member which can be properly positioned and can seal one outlet from the second outlet and incorporating integral biasing prongs which bias the valve element to a first position.

SUMMARY OF THE INVENTION

According to one embodiment of the invention, a diverter valve assembly includes a valve seat member positionable in a valve chamber within a faucet body. The valve seat has a peripheral lip portion for sealingly abutting a side wall of the valve chamber between an inlet thereto and a first outlet therefrom. A valve element is movably mounted to either a closed or open position with the valve seat such that when the valve is in the open position, fluid is allowed to flow from the inlet to the first outlet and when the valve element is closed with the valve seat, fluid does not flow from the inlet to the first outlet. Resilient flexible prongs depend from the valve seat member. Each prong has a section frictionally engaging a tapered surface of a spool connected to the valve element thereby biasing the spool and damping motion of the spool.

Preferably the peripheral lip portion also abuts a shoulder in the valve chamber for axially positioning the valve seat in the chamber. The valve seat member also has an end which is abutable against a spout base portion of the faucet. The abutting end has flexible tapered tips which can flex and fold over to compensate for manufacturing tolerances and provide an axially tight fit between the spout base and the valve body while providing a wear surface and low enough friction for rotation of the spout base. The end also has peripheral notches therethrough for allowing fluid flow radially outwardly therefrom.

An annular recess is positioned radially inward and adjacent the peripheral lip portion. The recess is in communication with the fluid pressure at the inlet to radially bias the lip portion outwardly against the side wall.

In one embodiment, the valve seat member includes an annular valve seat section, a cylindrical portion extending from the valve seat section, the lip portion extending radially outward from the cylindrical section and the notched end portion extending from the junction of the lip and cylindrical section. The cylindrical portion has circumferentially spaced internal longitudinal ribs that guide the valve element between its open and closed positions.

The valve seat member is preferably integrally formed with the peripheral lip, the resilient flexible prongs and the longitudinally extending ribs. A pressure responsive element preferably a flexible cup member is positioned at the other end of the spool and is responsive to pressure differential between the inlet and the second outlet such that when a lower pressure exists at the second outlet, the cup member moves to the second position and causes the valve element to move to the closed position against the valve seat. The cup member includes an annular flexible lip valve such that when in the second position, fluid can pass by the lip valve from the inlet to the second outlet.

The cup valve has a narrow annular groove at the end with the lip so that a small amount of collapse occurs to allow the lip to flex inwardly. The groove, however, is narrow so that excessive collapsing is prevented and the cup member maintains full function as a piston to force the valve element to its closed position. The lip is substantially more flexible than the rest of the cup member to provide adequate flow therearound when the spray is on.

The invention provides for an easily manufactured and easily installed diverter valve that seals the first outlet from the inlet and the second outlet and reduces chattering motion of the valve element. In addition, it provides for a diverter valve that eliminates annoying dripping through the spout when the spray is on. Furthermore, it provides an anti-siphon mechanism which allows for air from the first outlet to be drawn in back to the inlet if there is a negative pressure at the inlet and checks the water flow from the second outlet back to the inlet.

BRIEF DESCRIPTION OF THE DRAWINGS

Reference now will be made to the accompanying drawings in which.

DETAILED DESCRIPTION OF THE PREFERRED EMBODIMENT

Figure 1:
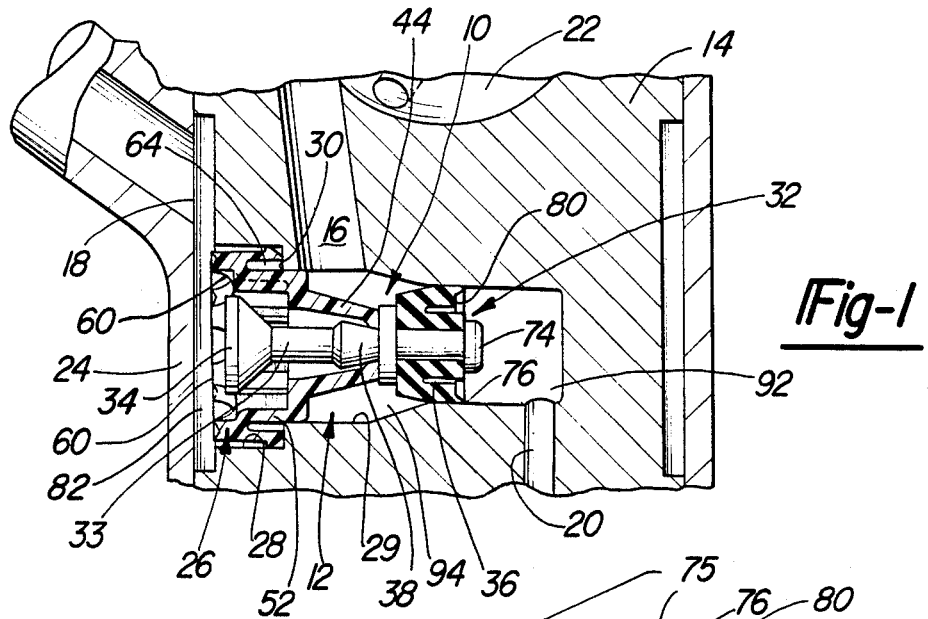
FIG. 1 is a segmented, side elevational view of a diverter valve assembly in a faucet body according to the invention showing the valve in its normal position.

Referring to FIG. 1, a diverter valve assembly 10 fits in a bored cavity 12 within a faucet body 14. The diverter valve controls the flow of water from inlet 16 to either a spout outlet 18 or a spray outlet 20. Inlet 16 is operably connected to hot and cold water supplies through valve mechanism 22. A rotatable spout base 24 surrounds the faucet body 14.

The diverter valve assembly 10 includes a one piece plastic valve seat member 26 which is seated in wider bored section 28 by abutting annular shoulder 30 of the cavity 12. A valve spool assembly 32 is slidably mounted through the valve seat member 26. The valve spool assembly 32 has a brass spool 33 that has an integral valve head 34 at one end, and elastomeric lip valve 36 commonly referred to as a cup mounted at another end. A tapered section 38 is positioned between the lip valve cup 36 and valve element 34.

Figure 6:
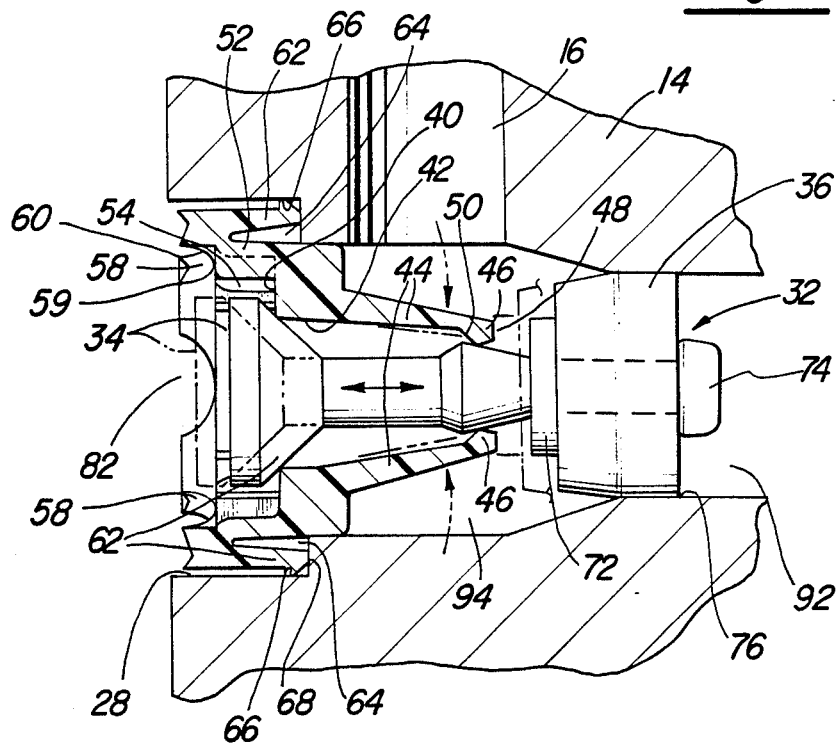
FIG. 6 is an enlarged fragmentary side elevational view similar to FIG. 1 showing the diverter valve in a second position.

Referring now to FIGS. 3-6, the valve seat member 26 will be described in more detail. The valve seat member can be made from Celcon M90 or Delrin 500 or an equivalent semii-flexible plastic material. The valve seat member 26 includes an annular valve seat 40 which is circumscribed about an aperture 42 through which the valve spool assembly 32 extends. The valve seat 40 seats valve element 34 when the valve element is moved to a first position as shown in FIG. 6. Depending from the valve seat 40 are circumferentially spaced flexible prongs 44. Each prong 44 radially extends inwardly as well as away from valve seat 40. Each prong 44 has at its distal end a flange 46 which radially inwardly extends toward the longitudinal axis of the valve seat member 26. Each flange 46 has a flat outer end 48 and a canted inner side 50.

Figure 7:
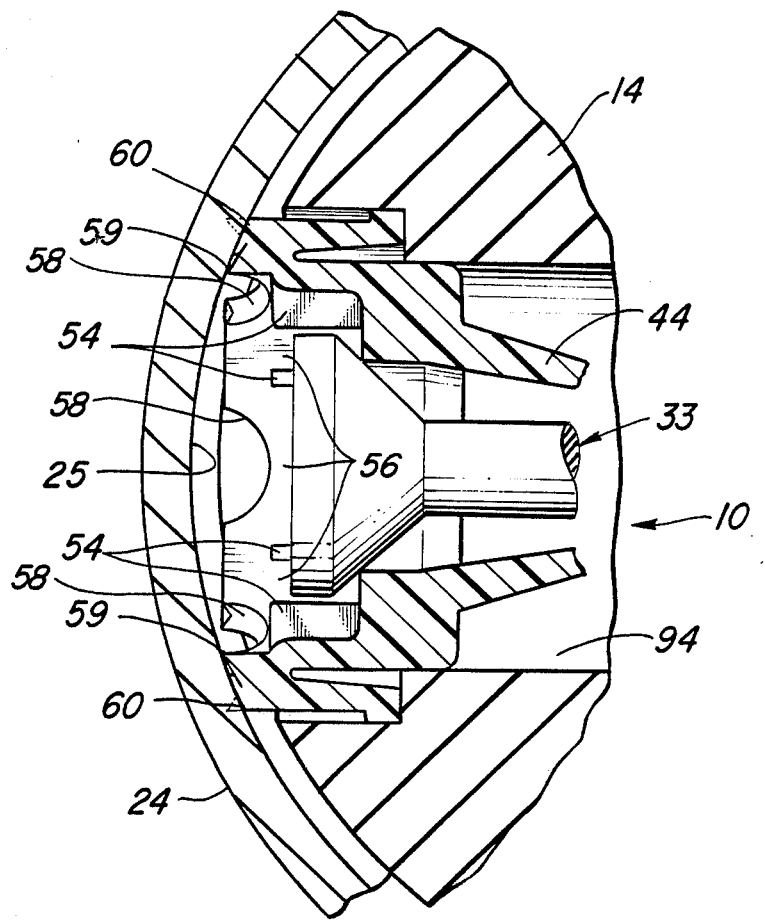
FIG. 7 is an enlarged fragmentary and sectional view along a horizontal plane showing the diverter valve seat member engaging the spout base.

Axially extending from the valve seat 40 is a cylindrical section 52 that has circumferentially spaced, longitudinally extending ribs 54 which form therebetween channels 56. The ribs radially extend inwardly and are sized to guide the valve element 34 as it slides away and toward the valve seat 40. The cylindrical section 52 has an end section 53 and a plurality of circumferentially spaced notches 58 which allow water to flow radially outwardly therethrough. The end section 53 has radially inner tips 59 shaped to conform to the inner wall 25 of spout base 24 and radially positioned outer tips 60 that are flexible to bend over and take up any space between inner tips 59 and wall 25 as shown in FIG. 7. The abutment of tips 60 to the rotatable spout base 24 prevents dislocation of valve seat member 26 such that when water pressure is exerted the valve seat member 26 is retained within the cavity 12.

An annular peripheral lip 62 extends from the cylindrical section 52 and is radially spaced from the cylindrical section 52 to form an annular recess 64. The peripheral lip has an annular bead 66 and an end shoulder 68 at its distal end. The bead 66 seals against the side wall of the cavity 12 and the shoulder 68 abuts annular shoulder 30 of the cavity 12. The cylindrical section 52 is sized slightly smaller than the narrow bored section 29 of cavity 12 to allow fluid communication with the recess from the inlet 16. The fluid pressure from inlet 16 will flex the lip outwardly to create the seal between the bead 66 and the bored section 28. The valve seat member 26 is axially fixed in position by the shoulders 68 abutting shoulder 30 and the tips 60 abutting spout base 24.

Figure 2:
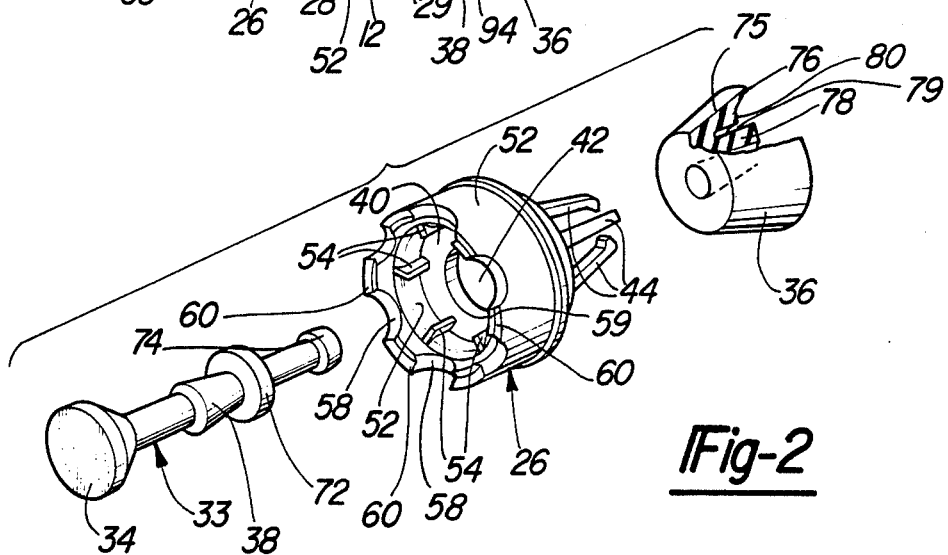
FIG. 2 is an exploded perspective and partially fragmented view of the diverter valve assembly.
Figure 3:
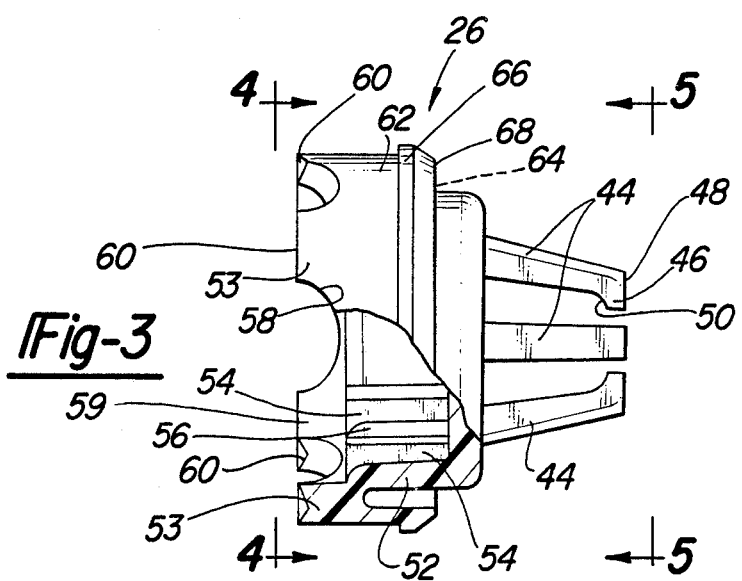
FIG. 3 is an enlarged side elevational and partially segmented view of the valve seat member.
Figure 4:
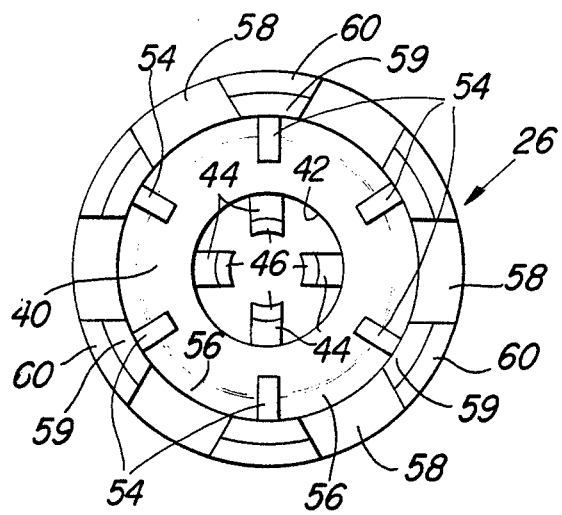
FIG. 4 is an end elevational view of the valve seat member taken along lines 4—4 shown in FIG. 3.
Figure 5:
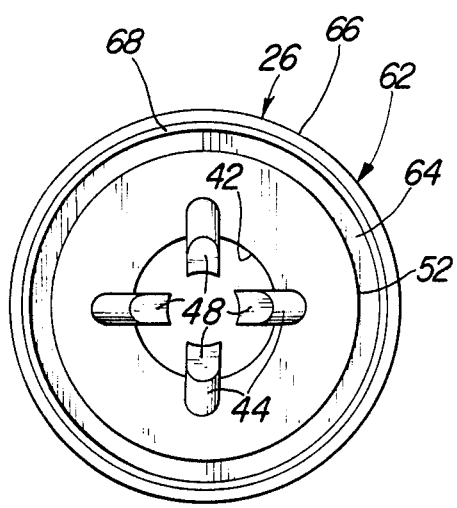
FIG. 5 is an end elevational view of the valve seat member taken along lines 5—5 shown in FIG. 3.

The valve spool assembly 32, as more clearly shown in FIGS. 2, 6 and 7 includes the brass spool 33 which incorporates the valve element 34, the tapered section 38, a flange section 72, and a head section 74. The cup lip valve 36, commonly referred to as a cup or U-valve, has an outer flexible lip 76 extending from an outer peripheral section 75. The lip 76 slidably engages the narrow bored section 29. The cup lip valve 36 has a tubular inner section 78 which is seated between the flange section 72 and the head section 74 of the spool 70. A narrow groove 79 having two parallel and coaxial side walls is defined between the inner section 78 and outer periphery 75. The cup is made from ethylene propylene. The lip is substantially thinner than the remainder of the outer periphery 75 such that a shoulder 80 is formed adjacent the lip 76 being substantially transverse to said side walls.

The diverter valve assembly 10 defines three separate chambers within the cavity 12. Firstly, chamber 82 which is downstream from valve element 34 in communication with the first spout outlet 18. Secondly, chamber 92 is positioned below cup lip valve 36 in communication with spray outlet 20. Finally, chamber 94 that is in communication with inlet 16 is situated between valve element 34 and cup lip valve 36.

Assembly of the diverter valve into the faucet is a simple operation by mere pressing of the diverter valve assembly 10 into the cavity in the proper position. No special rotated position is necessary. One rotated position is shown in FIG. 1 and a second rotated position is shown in FIG. 7. The spout base 24 is then positioned over the faucet body 14 to assure that the diverter valve assembly 10 is retained in its position. The outer tips 60 are folded over as shown in FIG. 7. The outer tips' unfolded position is shown in phantom in FIG. 7. The base 24 is positioned onto the valve body 14 and forces the tips 60 to fold over to assure both axial fixing of the valve seat member 26 and proper rotation of base 24. The outer tips 60 provide for more than a mere two point contact with the base by folding and conforming to the curvature of wall 25 as clearly shown in FIG. 7. This surface contact is desirable to provide a wear surface for rotation of base 24.

In operation, when the water pressure is off, the valve element 34 is moved to its first position as shown in FIG. 1. When the faucet is first turned on and the spray (not shown) is shut off, water flows through the inlet 16 through the aperture 42 and through the cylindrical section 52, particularly channels 56, and radially outward through notches 58 to exit spout outlet 18 as shown in FIG. 1. The channels 56 and notches 58 are sized to provide adequate flow therethrough. Any water flowing into chamber 92 past the lip valve cup 36 will quickly fill up any spray tube. The prongs 44 are constructed to be stiffer than the lip 76 to allow water to pass lip 76 rather than provide movement of the spool toward the second position as shown in FIG. 6. The prongs will bias the valve element toward the first position against the tapered section 38.

If the spray is turned on, water supplied from the inlet 16 creates a high pressure in chamber 94 while a low pressure is created in chamber 92 which allows the pressure from the water supply to press down on the lip valve member 36. The cup lip valve member 36 functions as a piston and moves the spool assembly 32 toward the second position as shown in FIG. 6. The narrow groove 79 allows only limited collapse so that the cup lip valve 36 retains sufficient cross-sectional area to function as a piston and move the spool assembly 32 against the force of the prongs and opening pressure against valve element 34. The lip 76 deflects inwardly toward the tubular inner section 78 to allow water to pass by the lip into the chamber 92 and through the spray outlet 20. The valve element 34 is seated on the valve seat 40 to close off the aperture 42 leading to the chamber 82 and spout outlet 18. Spout outlet 18 therefore receives no water when the spray is turned on.

When the spray valve (not shown) is closed, chambers 94 and 92 are momentarily equalized. The pressure acts upon the valve element 34 to force the spool assembly 32 toward the first position as shown in FIG. 6. As soon as the spool moves toward the first position, chamber 92 becomes a low pressure area that wants to pull down on the valve spool assembly 32. The prongs 44 resist this movement of the valve spool assembly as described to prevent the valve element 34 from reseating on the valve seat 40 to prevent knocking or chattering.

The prongs 44 are resiliently flexible such that when the water supply is shut off, the valve spool assembly 32 is biased to the position shown in FIG. 1. In addition, engagement of the flanges 46 against the tapered section 38 provides for a certain amount of friction which dampens the motion of the valve spool assembly 28. In this way, excessive shuttling of the valve spool assembly 32 is eliminated thereby preventing the valve element 34 from closing on the valve seat 40 and eliminating repetitive hammer-like knocking or chattering.

In addition, the diverter valve assembly 10 has an anti-siphon feature. Firstly, the lip 76 of the cup valve 36 acts as a check valve and allows water only to flow from the inlet 16 to the spray outlet 20. If the water supply attains a negative pressure and the spray is left in an open position in a sink full of water, the lip 76 prevents siphoning of the sink water back to the water supply. Furthermore, the prongs 44 provide a back-up anti-siphon mechanism. If per chance the lip 76 is faulty and the water leaks in the upstream direction, the valve element 34 is biased to the open position by prongs 44 such that if there is any negative pressure in the water supply, air is aspirated from the spout outlet 18 through the open aperture 42 to the inlet 16. Aspiration of air prevents water from flowing backward from outlet 20 by the lip 76. Furthermore, this diverter valve provides for sealing of chamber 82 from chamber 94 without any separate sealing rings. Water pressure from chamber 94 and inlet 16 is exerted in the annular recess 64 to press against the peripheral lip 62 of the valve seat member 26. The peripheral lip 62 also abuts the shoulder 30 of cavity 12 to position the valve seat member.

Furthermore, as the valve element 34 is moved between its open and closed position as shown in FIGS. 1 and 6, the longitudinal ribs 54 help guide the valve element and water is allowed to flow when the valve element is in the open position through channels 56 about the valve element 34.

Furthermore, the foldable tips 60 compensate for manufacturing tolerances to assure an axially tight fit and provide a wear surface for rotatable spout base 24.

In this fashion, the diverter valve assembly is inexpensively manufactured while providing an anti-chatter feature, an anti-siphon feature, easy installation in a faucet body, and no leakage to the spout when the spray is turned on.

Variations and modifications of the present invention are possible without departing from its spirit and scope as defined by the appended claims.

The embodiments of the invention in which an exclusive property or privilege is claimed are defined as follows:

1. A diverter valve assembly for a faucet characterized by:
   a valve seat member positionable in a valve chamber within a faucet body;
   said valve chamber having a first outlet, a second outlet, and an inlet;
   said valve seat having an integrally formed peripheral lip portion for sealingly abutting a side wall of said valve chamber between said inlet and said first outlet;
   a valve element movably mounted to one of a closed or open position with respect to said valve seat such that when in said open position, fluid is allowed to flow from said inlet to said first outlet and when in said closed position, fluid does not flow from said inlet to said first outlet;
   a pressure responsive means for moving said valve element between said closed and open positions with said pressure responsive means being responsive to a pressure differential between said inlet and said second outlet such that when a lower pressure is at said second outlet, said pressure responsive means moves said valve element to said closed position such that flow from said inlet is directed through said second outlet;
   a resilient biasing means for biasing said valve element to said open position when the pressure at said second outlet is not lower than the pressure at said inlet by a predetermined amount;
   said resilient biasing means including axially extending and resiliently flexible prongs depending from said valve seat member and having a second frictionally engaging a tapered surface of a spool connected to said valve element for biasing said spool and for damping motion of said spool;
   said peripheral lip portion also abuts a shoulder in said valve chamber for axially positioning said valve seat in said chamber;
   an annular recess located adjacent said peripheral lip portion and in communication with fluid pressure at said inlet to radially bias said lip portion outwardly against said side wall;
   an end portion of said valve seat member toward said first outlet having circumferentially spaced notches therein to allow fluid flow radially outward therefrom,
   said end portion abutable against a spout base of said faucet to fix the position of said valve member in conjunction with said lip portion and shoulder.

2. A diverter valve as defined in claim 1 further characterized by:
   said end portion has a plurality of foldable tips which can flex over to a folded position between said end portion and said spout base and abut against said spout base in their folded position.

3. A diverter valve as defined in claim 1 further characterized by:
said end portion having internal longitudinal ribs circumferentially spaced to guide said valve element between its open and closed position.

4. A diverter valve assembly for a faucet characterized by:
a valve seat member positionable in a valve chamber within a faucet body;
said valve chamber having a first outlet, a second outlet, and an inlet;
said valve seat having an integrally formed peripheral lip portion for sealingly abutting a side wall of said valve chamber between said inlet and said first outlet;
a valve element movably mounted to one of a closed or open position with respect to said valve seat such that when in said open position, fluid is allowed to flow from said inlet to said first outlet and when in said closed position, fluid does not flow from said inlet to said first outlet;
a pressure responsive means for moving said valve element between said closed and open positions with said pressure responsive means being responsive to a pressure differential between said inlet and said second outlet such that when a lower pressure is at said second outlet, said pressure responsive means moves said valve element to said closed position such that flow from said inlet is directed through said second outlet;
a resilient biasing means for biasing said valve element to said open position when the pressure at said second outlet is not lower than the pressure at said inlet by a predetermined amount;
said resilient biasing means including axially extending and resiliently flexible prongs depending from said valve seat member and having a second frictionally engaging a tapered surface of a spool connected to said valve element for biasing said spool and for damping motion of said spool;
an end portion of said valve seat member toward said first outlet having circumferentially spaced notches therein to allow fluid flow radially outward therefrom,
said end portion being abutable against a spout base of said faucet to fix the position of said valve member in conjunction with said lip portion and shoulder.

5. A diverter valve as defined in claim 4 further characterized by:
said end portion has a plurality of foldable tips which can flex over to a folded position between said end portion and said spout base and abut against said spout base in their folded position.

6. A diverter valve as defined in claim 4 further characterized by:
said end portion having internal longitudinal ribs circumferentially spaced to guide said valve element between its open and closed position.

7. A diverter valve assembly for a faucet characterized by:
a valve seat member positionable in a valve chamber within a faucet body;
said valve chamber having a first outlet, a second outlet, and an inlet;
said valve seat having an integrally formed peripheral lip portion for sealingly abutting a side wall of said valve chamber between said inlet and said first outlet;
a valve element movably mounted to one of a closed or open position with respect to said valve seat such that when in said open position, fluid is allowed to flow from said inlet to said first outlet and when in said closed position, fluid does not flow from said inlet to said first outlet;
a pressure responsive means for moving said valve element between said closed and open positions with said pressure responsive means being responsive to a pressure differential between said inlet and said second outlet such that when a lower pressure is at said second outlet, said pressure responsive means moves said valve element to said closed position such that flow from said inlet is directed through said second outlet;
a resilient biasing means for biasing said valve element to said open position when the pressure at said second outlet is not lower than the pressure at said inlet by a predetermined amount;
said resilient biasing means including axially extending and resiliently flexible prongs depending from said valve seat member and having a second frictionally engaging a tapered surface of a spool connected to said valve element for biasing said spool and for damping motion of said spool;
an end portion of said valve seat member toward said first outlet having circumferentially spaced longitudinal extending ribs for guiding said valve element between its open and closed position.

8. A diverter valve assembly for a faucet characterized by:
a one piece valve seat member positionable in a valve chamber within a body;
said valve chamber having a first outlet, a second outlet, and an inlet;
said valve seat having an integrally formed peripheral lip portion for sealingly abutting a side wall of said valve chamber between said inlet and said first outlet;
a valve element movably mounted to one of a closed or open position with said valve seat such that when in said open position, fluid is allowed to flow from said inlet to said first outlet and when in said closed position, fluid does not flow from said inlet to said first outlet;
a pressure responsive means for moving said valve element between said closed and open positions with said pressure responsive means being responsive to a pressure differential between said inlet and said second outlet such that when a lower pressure is at said second outlet, said pressure responsive means moves said valve element to said closed position such that flow from said inlet is directed through said second outlet;
a resilient biasing means for biasing said valve element to said open position when the pressure at said second outlet is not lower than the pressure at said inlet by a predetermined amount;
said resilient biasing means including axially extending and resiliently flexible prongs depending from said valve seat member and integrally formed therewith;
said prongs having a section frictionally engaging a tapered surface of a spool connected to said valve element for biasing said spool and for damping motion of said spool;

said peripheral lip portion abutting a shoulder in said valve chamber for axially positioning said valve seat in said chamber;

an annular recess located adjacent said peripheral lip portion and in communication with fluid pressure at said inlet to radially bias said lip portion outwardly against said side wall;

an end portion of said valve seat member toward said first outlet having circumferentially spaced notches therein to allow fluid flow radially outward therefrom;

said end portion being abutable against a spout base of said faucet to fix the position of said valve member in conjunction with said lip portion and shoulder;

said end portion having internal longitudinal ribs circumferentially spaced to guide said valve element between its open and closed position.

9. A diverter valve as defined in claim 8 further characterized by:

said end portion has a plurality of foldable tips which can flex over to a folded position between said end portion and said spout base and abut against said spout base in their folded position.

10. A diverter valve assembly for a faucet characterized by:

a one piece valve seat member;

said valve seat member having an integrally formed peripheral lip portion for sealingly abutting a side wall of a valve chamber;

a valve element movably mounted to one of a closed or open position with said valve seat member;

said peripheral lip portion also abuts a shoulder in said valve chamber for axially positioning said valve seat in said chamber;

a downstream end portion of said valve seat member having circumferentially spaced foldable tips which can flex over to a folded position between said end portion and a spout base positioned in proximity thereto such that said tips abut against said spout base in their folded position.

11. A diverter valve assembly for a faucet characterized by:

a valve seat member positionable in a valve chamber within a faucet body;

said valve chamber having a first outlet, a second outlet, and an inlet;

a valve element movably mounted to one of a closed or open position with respect to said valve seat such that when in said open position, fluid is allowed to flow from said inlet to said first outlet and when in said closed position, fluid does not flow from said inlet to said first outlet;

a cup valve operably connected to said valve element and mounted between said inlet and said second outlet with a peripheral section and a peripheral lip extending from said peripheral section and being substantially thinner than said peripheral section;

said cup valve having an inner tubular section and a narrow annular groove having spaced coaxial and parallel side walls being defined between said inner tubular section and said outer peripheral section such that only limited collapse of said cup valve is allowed under fluid pressure from said inlet such that when said lower pressure is at said second outlet, said cup valve retains sufficient cross-sectional area to function as a pressure responsive piston and move said valve element to its closed position against fluid pressure from said inlet exerted on said valve element;

said peripheral lip being substantially thinner than said peripheral section such that an annular shoulder is defined at said peripheral section adjacent said peripheral lip, said annular shoulder being substantially transverse to the parallel side walls of the annular groove.

12. A diverter valve as defined in claim 11 further characterized by:

said valve seat having an integrally formed peripheral lip portion for sealingly abutting a side wall of said valve chamber between said inlet and said first outlet;

a resilient biasing means for biasing said valve element to said open position when the pressure at said second outlet is not lower than the pressure at said inlet by a predetermined amount;

said resilient biasing means including axially extending and resiliently flexible prongs depending from said valve seat member and having a section frictionally engaging a tapered surface of a spool connected to said valve element for biasing said spool and for damping motion of said spool.

* * * * *